United States Patent [19]
Song

[11] Patent Number: 6,079,011
[45] Date of Patent: Jun. 20, 2000

[54] APPARATUS FOR EXECUTING A LOAD INSTRUCTION OR EXCHANGE INSTRUCTION IN PARALLEL WITH OTHER INSTRUCTIONS IN A DUAL PIPELINED PROCESSOR

[75] Inventor: Yoon Seok Song, Kyoungki-do, Rep. of Korea

[73] Assignee: Hyundai Electronics Industries Co., Ltd., Ichon-shi, Rep. of Korea

[21] Appl. No.: 08/964,113

[22] Filed: Nov. 5, 1997

[30] Foreign Application Priority Data

Nov. 6, 1996 [KR] Rep. of Korea ............... 96-52477

[51] Int. Cl.[7] ........................................ G06F 9/38
[52] U.S. Cl. .................... 712/214; 711/200; 712/208
[58] Field of Search ........................ 711/221, 200, 711/211; 712/23, 200, 208, 214

[56] References Cited

U.S. PATENT DOCUMENTS

| 5,367,650 | 11/1994 | Sharangpani et al. | 711/221 |
|---|---|---|---|
| 5,475,824 | 12/1995 | Grochowski et al. | 712/206 |
| 5,634,118 | 5/1997 | Blomgren | 712/226 |
| 5,764,943 | 6/1998 | Wechsler | 712/218 |
| 5,913,047 | 6/1999 | Mahalingaiah et al. | 712/213 |

*Primary Examiner*—Meng-Ai T. An
*Assistant Examiner*—Walter Benson
*Attorney, Agent, or Firm*—Jacobson, Price, Holman & Stern, PLLC

[57] ABSTRACT

An apparatus having a stack-top updating unit for processing an exchange instruction and a load instruction in parallel in a pipe-lined processor having a stack register file. Based on an information signal representing a modification of the stack-top after the current instruction is executed in a first pipe-line, a control signal indicating that a load instruction is executed by one of the first and second pipe-lines, and a second pipe-line enable signal, the stack-top updating unit generates a new stack-top signal and a current stack-top signal. The first pipe-line, in response to the current stack-top signal and operands, executes the operands, and the second pipe-line, in response to the new stack-top signal and the control signal, performs the load instruction or an exchange instruction. As a result, the load instruction or the Fload instruction can be simultaneously executed with another instruction or operand in the pipe-lined processor in an effective manner.

7 Claims, 7 Drawing Sheets

APPARATUS FOR EXECUTING A LOAD INSTRUCTION OR EXCHANGE INSTRUCTION IN PARALLEL WITH OTHER INSTRUCTIONS IN A DUAL PIPELINED PROCESSOR

BACKGROUND OF THE INVENTION

1. Field of the Invention

The present invention relates to a microprocessor, and more particularly, to a parallel executing apparatus of a load instruction which can execute the load instruction as well as the exchange instruction in parallel in dual pipe-lined processor, and also can be applied to the design part which needs the technique that simultaneously executes the floating point arithmetic and the floating point load instruction.

2. Description of Prior Art

In the processor that has a data storage place of a stack structure, any instruction should use a value in a stack-top as an operand. Accordingly, to execute the new instruction that is pipe-lined, it should take the new operand to the stack-top. There are two ways to take the new operand to the stack-top, using the load instruction and the exchange instruction.

In the conventional technique, among the two ways, only the way that executes the exchange instruction in parallel is used. But an artificial dependency which is in the stack-top, can not be perfectly removed using that way only.

When any instruction executes in the processor including a register file of the stack structure, let's find out how the stack structure is used and what effect it has on the instruction process.

In order for a certain instruction to be executed, one or two source operands to which the operation applies and one destination operand to which the result of this operation is to be stored are necessary. Of course, there are particular instructions which don't take the source operand or the destination operand. But most of the instructions need the source operand and the destination operand.

In the register file of the stack structure, as cpu assigns a register by the source operand and destination operand, it's possible to assign through the stack-top register or to a relative offset from the top. Therefore, in case the stack-top is changed, the offsets that assign lower registers than the stack-top, should be changed.

The especially important fact is that an instruction needing a source operand must use the stack-top as the source operand. That is, the instruction which has one source operand should use the stack-top register as the source operand, and the instruction which needs two source operands should use the stack-top register as at least one of the source operands. Also, most of the instructions use the stack-top register as the destination operand which stores a result of the operation. So, in order for a certain instruction to be executed, it can be operated only when the necessary source operand is moved to a stack-top. As a result, the processor with the register file of the stack structure create a bottleneck, and the problem to be solved is how efficiently to solve the bottleneck.

As we mentioned above, when an instruction is executed, there should be data which is required in the stack-top. If the data is a result of the previous instruction (i.e the data have a true dependency), we should wait until the execution of the previous instruction is finished.

But if the data is not related to a result of the previous instruction, the data should be taken to a stack-top as quickly as possible. However, we should wait until the operation is finished because most of the previous instructions store the result of the operation in the stack-top. This case is not dependent on the actual data value, but has an artificial dependency which occurs only because we should use the stack-top. So, to remove the bottleneck of the stack-top, it is possible to use a method that executes as if there is no dependency when this artificial dependency occurs. In the conventional technology, a method (U.S. Pat. No. 5,367, 650) that effectively executes the exchange instruction which exchanges a content of the stack-top with a content of other register in the stack is used. The method can be explained referring to FIG. 1A to FIG. 1C.

Figure 1A:
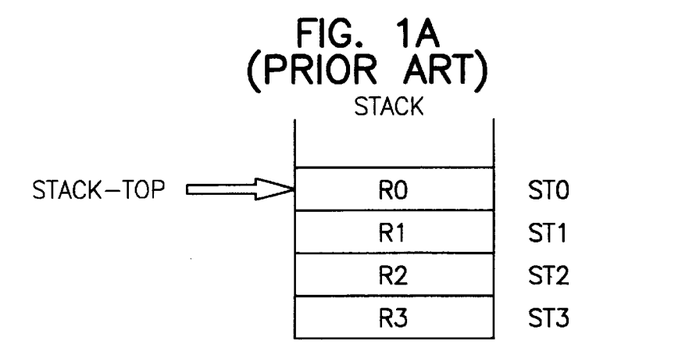
FIGS. 1A to 1C are the concept diagrams that take the new operand to the stack-top according to the conventional prior art exchange instruction.
Figure 1B:
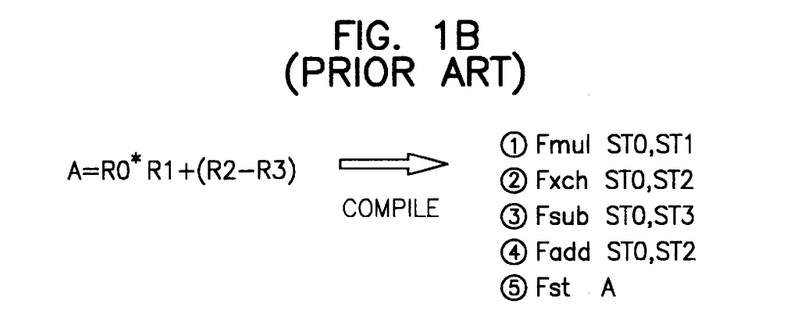

FIG. 1A shows the stack structure and its contents before the execution. R0–R3 shows the actual data value. ST0–ST3 shows the relative offset representing the relation of the top and lower register in the stack. FIG. 1B shows the operation to be executed, and the operation is the sum of the result of [R0–R1] and that of [R2–R3]. It is composed of instructions (i.e, a multiplication instruction of floating point data Fmul, an exchange instruction of floating point data Fxch, a subtraction instruction of floating point data Fsub, an addition instruction of floating point data Fadd and a storing instruction of floating point data Fst) compiled through an operation compiler. Those are shown in a right side of FIG. 1B. The Fmul instruction in "1" and the Fsub instruction in "3" do not depend upon prior calculations for the necessary source operand data. However, because we use the stack structure, there is an artificial dependency between the two instructions due to the stack-top. So, before executing the Fsub instruction, firstly data R2 stored in the ST2 must be put into the stack-top by means of the execution of the Fxch instruction. In the case of the consecutive execution of the Fxch instruction, referring to in FIG. 1C, the Fxch instruction is stalled in the pipe-line until the Fmul instruction processing is completed. And then, data R2 and the result of the Fmul instruction should be exchanged. Up to this, the efficiency is rapidly dropped because the Fsub instruction must wait until the Fxch instruction is finished.

Therefore, the previous invention created the method that can execute the Fxch instruction and the Fmul instruction in parallel. However, this result is to get data R2 of ST2 instead of data R0 of ST0 in FIG. 1C.

Figure 1C:
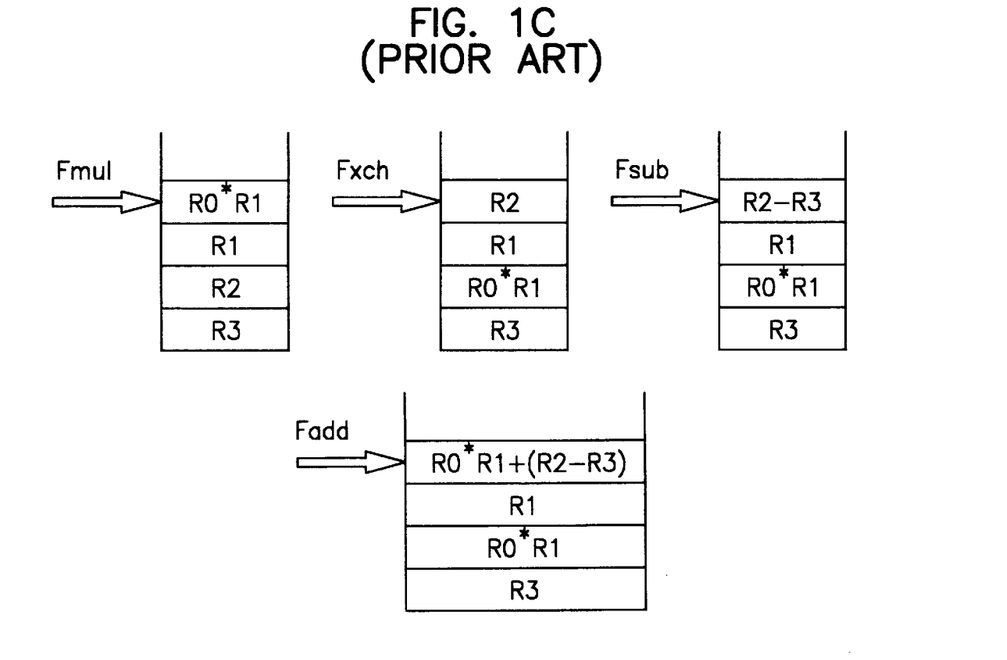

The problem of the conventional technique as above is that the source operand of the next operation (operand as data R2 in the example of FIG. 1) is always inside of the stack. Therefore, the prior art method can't entirely remove the artificial dependency which exists in the stack-top.

OBJECT OF THE INVENTION

An object of this invention is to provide a parallel executing apparatus of a load instruction which can execute the load instruction as well as the exchange instruction in parallel in the dual pipe-lined processor.

The instruction that loads data into the stack from the memory always assigns a new entry onto the present top of stack and makes it again into a new top of stack. Therefore, the following instructions can be executed with the new stack-top. This is, the dependency on the stack-top is eliminated. So, if the load instruction is rapidly executed, following instructions will be rapidly executed in a pipe-lined manner.

Considering that the load instruction, unlike the other instructions, doesn't use the current stack-top, it is possible to simultaneously treat the load instruction with the previous instruction in a dual pipe-line. This invention represents how the load instruction is simultaneously executed in the dual pipe-line.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE INVENTION

To obtain the above object, there is provided an apparatus for processing an exchange instruction and a load instruction from a memory in parallel a in pipe-lined processor having a first pipe-line, a second pipe-line and a register file of a stack structure, the apparatus comprising a stack-top updating means for generating a new stack-top signal and a current stack-top signal by updating the stack-top after receiving an information signal that is about a modification of the stack-top of which follows an instruction to be executed by the first pipe-line, corresponding to both a signal which represents a load instruction executed by the second pipe-line or the first pipe-line and a second pipe-line enable signal; a first pipe-line address generating means for generating a first source operand pointer address, a second source operand pointer address and a first destination operand pointer address of instruction which is to be executed in the first pipe-line by receiving the current stack-top signal, a first source operand, a second source operand and a first destination information of instruction inputted to the first pipe-line; a second pipe-line address generating means for generating a third source operand pointer address and a fourth operand pointer address of the load instruction or the exchange instruction which is to be executed in the second pipe-line by receiving the source operand of the instruction which comes to the second pipe-line, the new stack-top signal, the first source operand pointer address and the second source operand pointer address, corresponding to both the second pipe-line enable signal and a first signal representing that the load instruction is executed at the first pipe-line or the second pipe-line; a pointer register file that has an address of an actual data register file by receiving the address output from both the second pipe-line address generating means and the first pipe-line address generating means; and a physical data register file for outputting a stored operand to an execution unit corresponding to the actual data register file address output from the pointer register file.

Hereinafter, the present invention will be described in detail referring to accompany drawings.

The present invention is a method for executing instructions in parallel, whether the source operand of the next operation is in a memory or in the stack. This can be explained in the FIGS. 2A to 2C as an example.

Figure 2A:
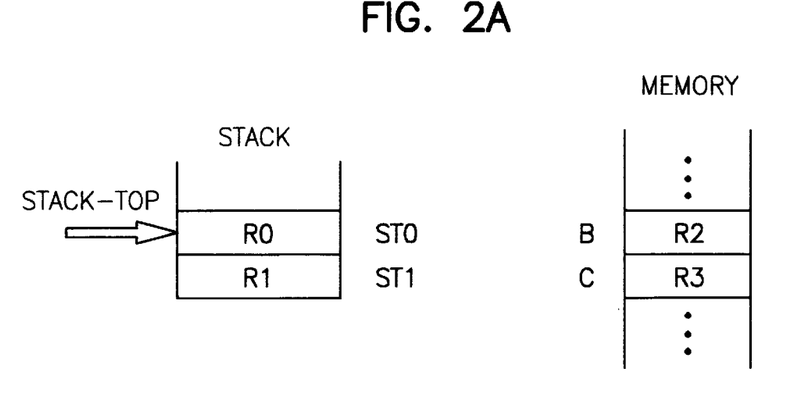
FIGS. 2A to 2C are the concept diagrams that take the new operand to the stack-top according to the present invention.
Figure 2B:
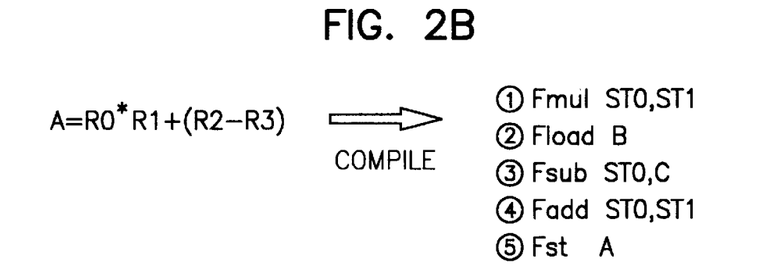

FIG. 2A shows the stack state and the memory state in the initial stage. FIG. 2B shows the instructions after compiling the operation previously shown in FIG. 1. Compared to FIG. 1B, there is no difference except that the Fxch instruction is changed into a load instruction of floating point data Fload and the second source operand of the Fsub instruction is changed into a memory address C. The Fsub instruction in "3" of FIG. 2B doesn't depend on the result of the Fmul instruction, but the execution of the Fsub instruction is possible only after execution of the Fload instruction in "2". Therefore, how rapidly to execute the Fload instruction is a keypoint of the performance. Also, though the Fload instruction has no need to wait for the result of the Fmul instruction, unlike the Fxch instruction, it should wait for the Fmul instruction till the stack-top is newly made. However, as the Fload instruction has no dependency on the data from any previous instruction, it can be simultaneously executed with the previous instruction. Therefore, it can be executed in parallel together with the first stack and the second stack of FIG. 2C.

Figure 2C:
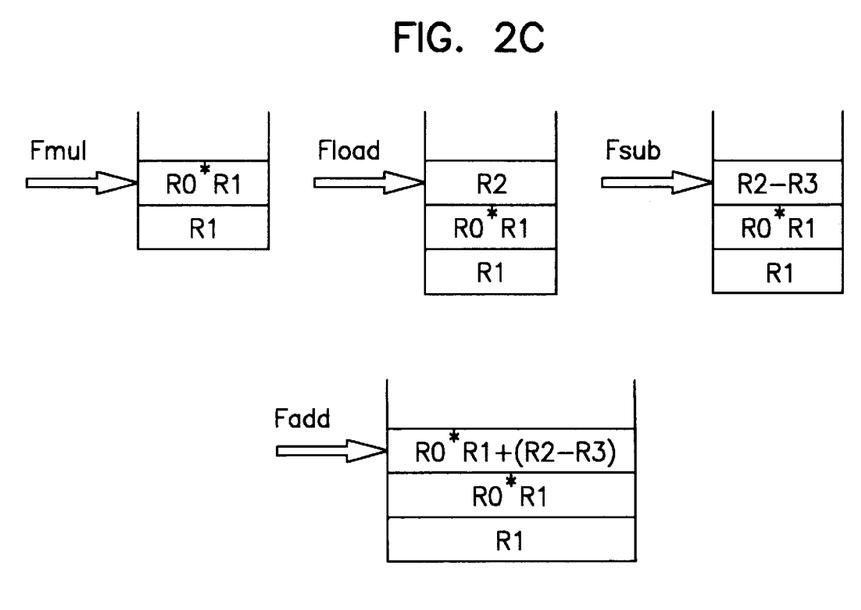

However, in the case that the previous instruction of the Fload instruction pops the stack after it executes the operation, the stack entry loaded by the Fload instruction and the stack entry which stores the result of the previous instruction is the same. So, if the Fload instruction is first executed and after the result is used, the result is unexpected. Therefore, for executing the Fload instruction in parallel, the previous instruction should be the unpopping instruction.

Figure 3:
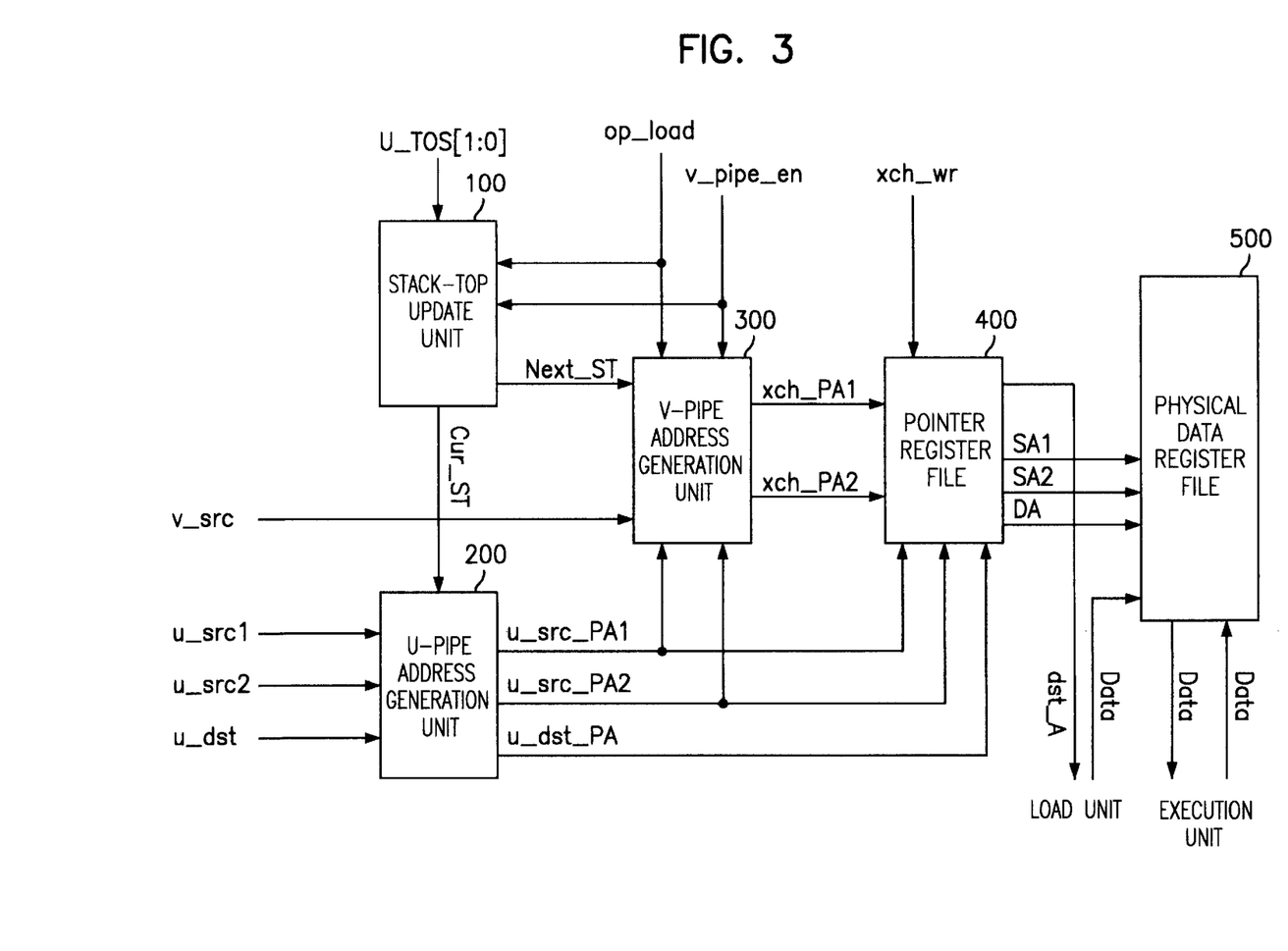
FIG. 3 is a circuit block diagram of the present invention in order to execute the load instruction in parallel.

As explained so far, the whole structure that enables the Fxch instruction and the Fload instruction to simultaneously execute in parallel with the previous instruction, is shown in FIG. 3.

With the circuit in FIG. 3, if the necessary information about the source operand is offered after decoding the instruction in the outside, it sends a value of the necessary operand from the register file of the stack structure using the information.

There are two pipe-lines, referred to as u-pipe and v-pipe. And the two pipes are not simultaneously executed every time. In this case, only one process will be executed only by u-pipe.

The two pipes can be executed in parallel only in case that the Fload instruction or the Fxch instruction follows other instructions. The information of the necessary operand in each pipe is transmitted through u-src1, u_src2, u_dst and v_src. The signals u_src1, u_src2 and u_dst have the operands which come to u-pipe, and v_src has the source operand of the Fxch instruction which comes to v-pipe. Also, U_TOS[1:0] inputted from the outside is about the modification of the stack-top after the current instruction is executed in u-pipe. That is, U_TOS[1:0] has encoded values to -1, 0, +1, and +2. Also the control signal, op_load, represents that the Fload instruction is executed at u-pipe or v-pipe. So to speak, it represents that the Fxch instruction or the Fload instruction is simultaneously executed with other instructions.

Also, as a data interface to an external execution unit, there are the source operand value and returned value that are necessary for the execution. And there separately exists a destination register number for the Fload instruction.

As shown in FIG. 3, the circuit block of the present invention that executes the load instruction in parallel consists of (i) a stack-top update unit 100 that generates a new stack-top signal, Next_ST, and the current stack-top signal, Cur_ST, by receiving the U_TOS[1:0], the op_load signal and a v-pipe enable, signal v_pipe_en, (ii) a u-pipe address generation unit 200 that outputs the operand pointer address, u_src_PA1, u_src_PA2 and u_dst_PA of the instruction which is to be executed in u-pipe by receiving the current stack-top signal Cur_ST and the operands, u_scr1 u_src2 and u_dst input to the u-pipe, (iii) a v-pipe address generation unit 300 that outputs the operand address of the Fload instruction or the Fxch instruction, xch_PA1, xch_PA2 by receiving the source operand of the Fxch instruction, v_src signal which comes to v-pipe with controlling signals v_pipe_en and op_load, the Next_ST signal and the operand pointer address, u_src_PA1 and u_src_PA2, (iv) a pointer register file 400 that has the address of the actual data register file, and (v) a physical data register file 500.

Figure 4:
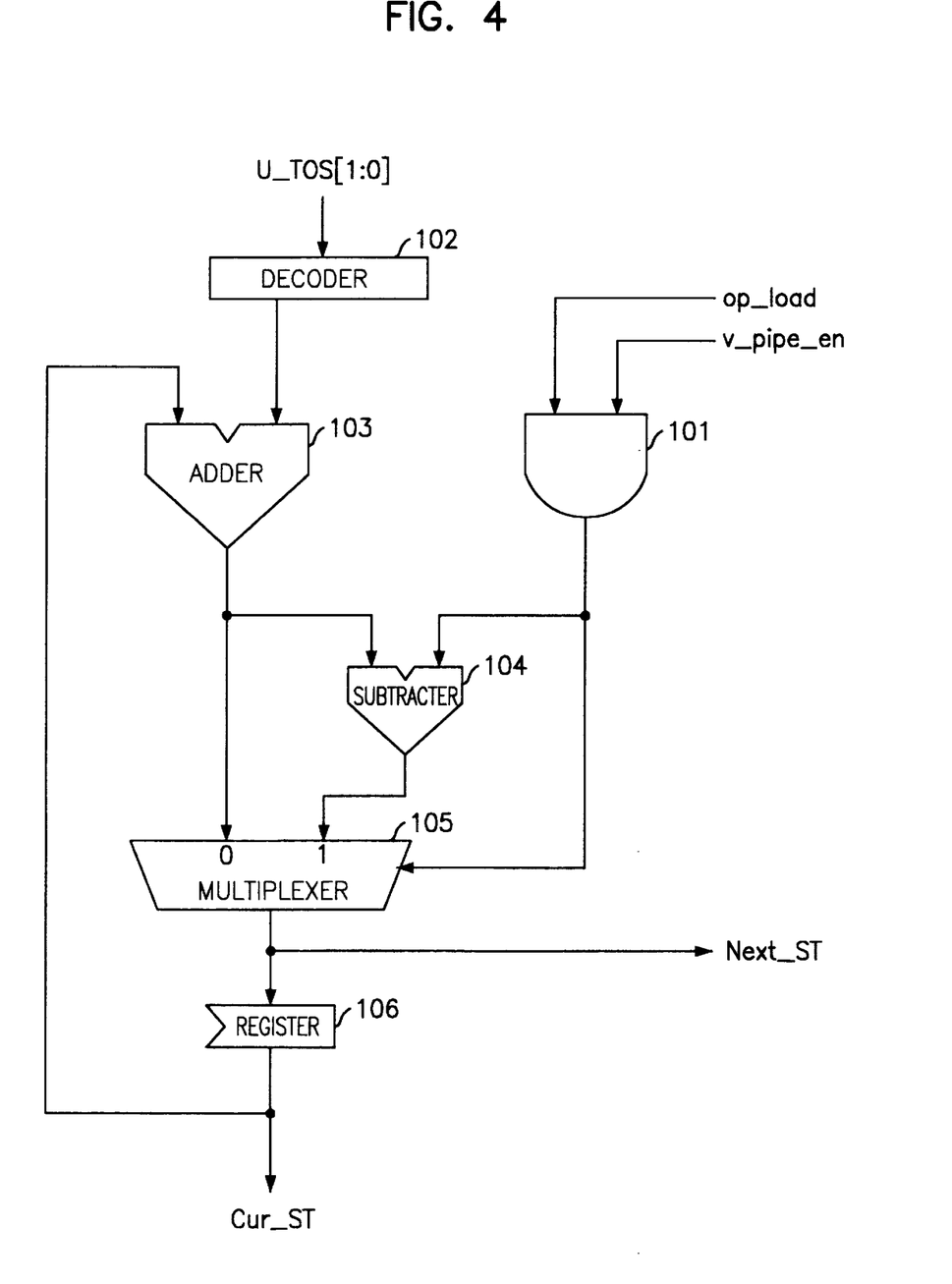
FIG. 4 is a detailed block diagram of the stack-top update unit of FIG. 3.

As the detailed circuit diagram of a stack-top update unit 100, FIG. 4 consists of (i) AND gate 101 for ANDing the v-pipe enable signal, v_pipe_en and op_load signal, (ii) decoder 102 that decodes U_TOS[1:0], the information signal which is on the modification of stack-top, (iii) adder 103 that adds the decoded U_TOS signal and the current stack-top signal, Cur_ST, (iv) subtracter 104 that subtracts 1 from the output signal of said adder 103 corresponding to the output signal of said AND gate 101, (v) multiplexer 105 that outputs the new stack-top signal Next_ST, which is a selected one of the output signal of the adder 103 and the output signal of the subtracter 104 that corresponds to the output signal of the AND gate 101 and (vi) the register 106 ,storing the output signal of the multiplexer 105, that outputs the Cur_ST signal.

The stack-top update unit 100 as mentioned above generates the v_load signal through the AND gate 101 which detects the case in which the Fload instruction reaches to the v-pipe, and calculates a new stack-top Next_ST through subtracter 104 which subtracts 1 from the stack-top by u-pipe according to the v_load. This circuit is valid only when the Fload instruction reaches to v-pipe, and when it comes to u-pipe, it is subtracted as much as 1 by U_TOS. So, it is additionally unnecessary to treat it. In this unit within which the Next_ST and the Cur_ST are generated, Cur_ST (Current Stack Top) is used in calculating the address of the source operand that comes to u-pipe as the current stack-top.

Figure 5:
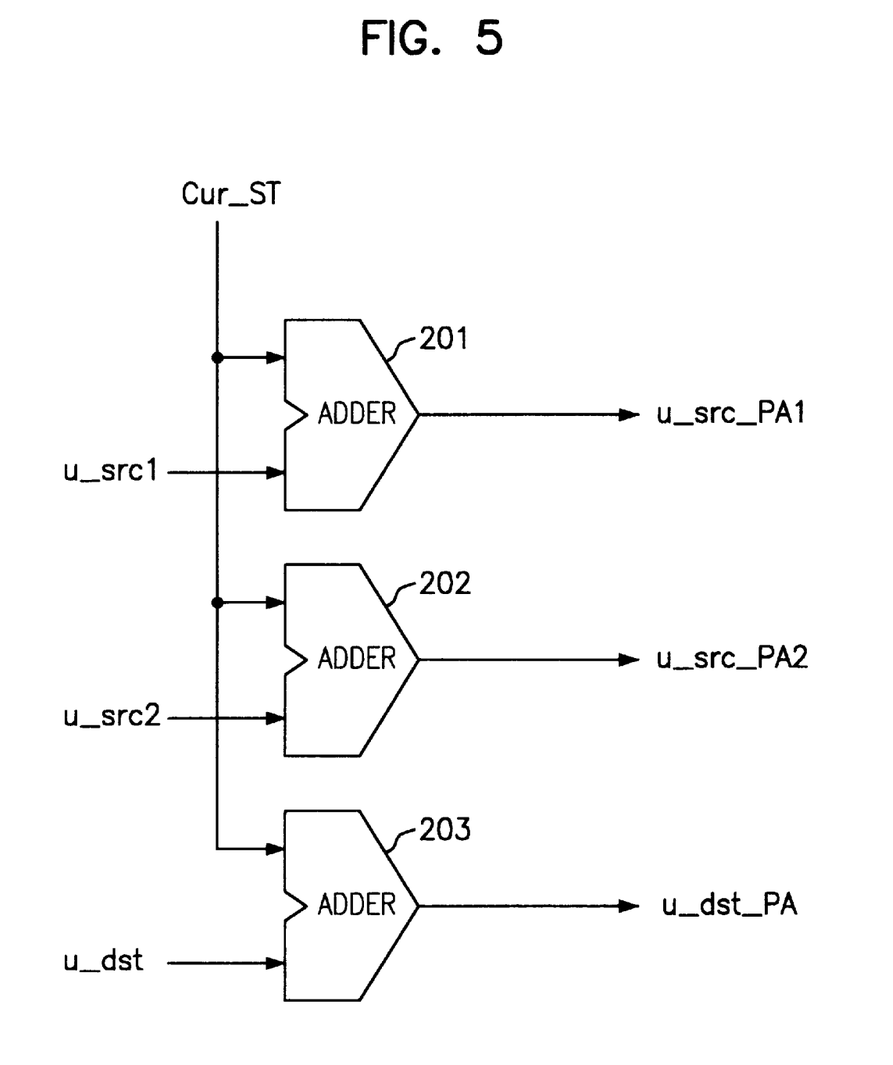
FIG. 5 is a detailed block diagram of an u-pipe address generation unit of FIG. 3.

FIG. 5 depicts the u-pipe address generation unit 200 composed of several adders 201, 202 and 203 which only add the offset to the current stack-top and calculates the addresses of the operands which comes to u-pipe. The addresses which are generated here, become the address of stack pointer register file 400. However, it doesn't mean the actual address of the register file 500. The actual address of the register file is stored in each entry within the pointer register file 400.

Figure 6:
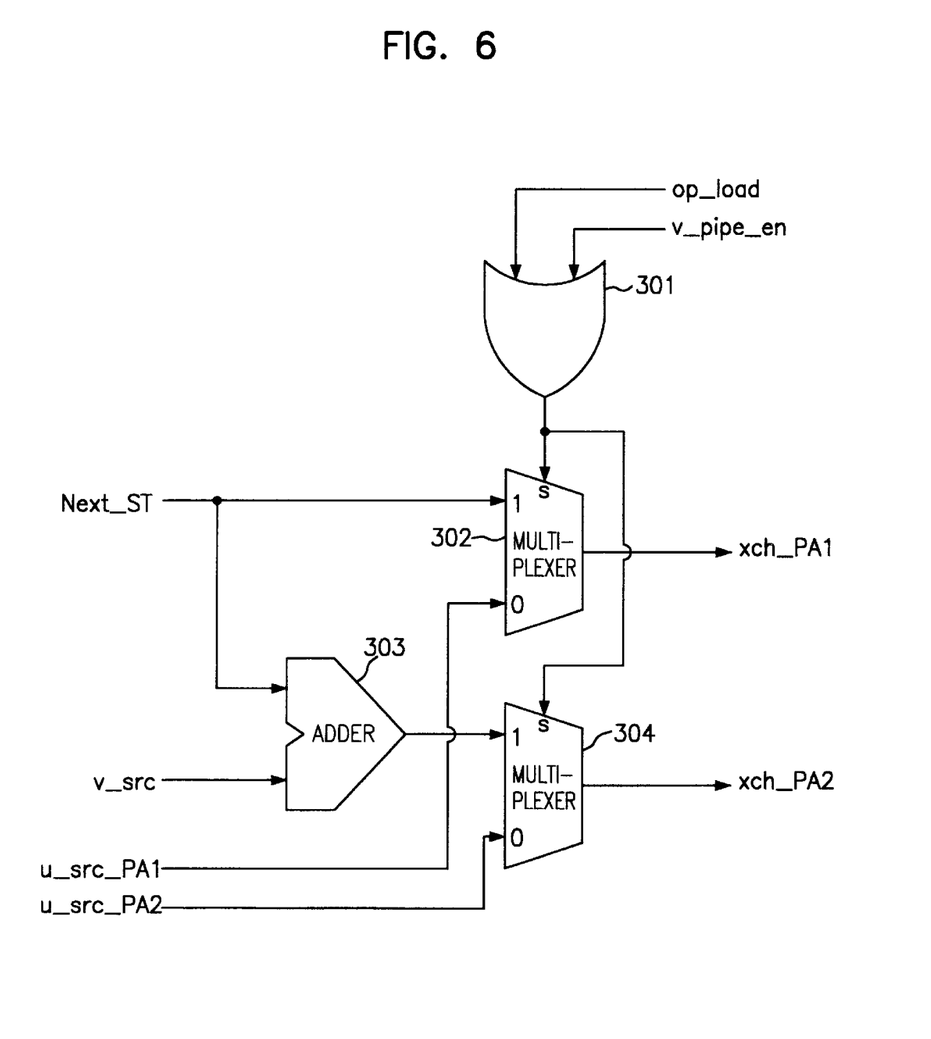
FIG. 6 is a detailed block diagram of a v-pipe address generation unit of FIG. 3.

FIG. 6 depicts the v-pipe address generation unit 300, which calculates the address of the operands of the Fload instruction or the Fxch instruction. This unit consists of (i) an OR gate 301 for ORing the v_pipe_en signal and the op_load signal, (ii) a first multiplexer 302 that outputs the xch_PA1 signal, which is a selected one of the Next_ST and the u_src_PA1 that corresponds to the output signal of the OR gate 301, (iii) an adder 303 that adds the Next_ST signal and the v_src signal and (iv) a second multiplexer 304 that outputs the xch_PA2 signal, which is a selected one of the output signal of the adder 301 and the u_src_PA1 signal that corresponds to the output signal of the OR gate 301.

When the Fxch instruction comes to v-pipe, the address of source operand is the value that adds the Next_ST to the offset which comes to Next_ST and v_src. In case it comes to the u-pipe, the address of the operand is the source operand that comes from the u-pipe address generation unit 200. In case the Fload comes to the u-pipe or the v-pipe, the destination address that is to be loaded must be generated by the next_ST and its result is used in the same line as the src1 operand address of the Fxch instruction. Therefore, in the case of the Fload instruction or in case that the Fxch comes to v-pipe by the OR gate 301, the selection of the first multiplexer 302 and the second multiplexer 304 will be "1". The case that the selection becomes "0", applies only to the case that the Fxch instruction comes to u-pipe. Of course, it becomes "0" naturally on the other instructions except for the Fxch instruction or the Fload instruction.

Figure 7:
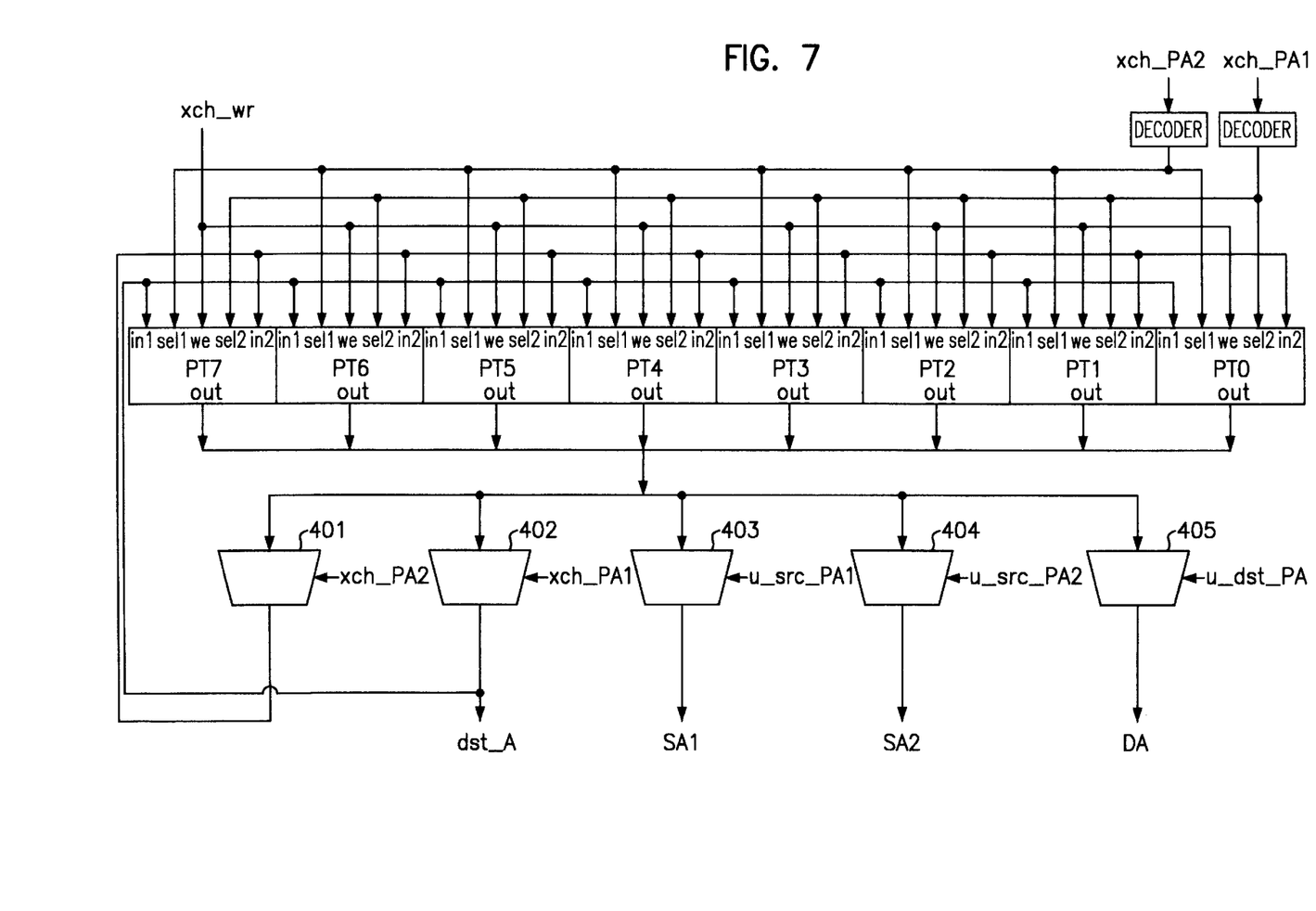
FIG. 7 is a detailed block diagram of a pointer register file of FIG. 3.

FIG. 7 is the detailed circuit diagram of pointer register file 400. Each entry has its address which is to the actual register file and the whole structure can be used as stack structure. At the initial stage of each entry, it should have the same value as its own address. The pointer register file 400 has 5 read ports 401, 402, 403, 404 and 405. The three ports 403, 404 and 405 are ports which read two source operand addresses, u_src_PA1 and u_src_PA2 and the destination operand address, u_dst_PA whose instruction is to be executed at u-pipe (except the Fxch instruction). The two ports 401 and 402 are ports which read the operand addresses, xch_PA1 and xch_PA2 of the Fxch instruction or the Fload instruction. These two addresses actually don't go to register file, but are stored in the pointer register file 400, changing its order each other. Accordingly, the execution of the Fxch instruction is possible by exchanging the pointer values with each other without directly exchanging the data. Also, because one of the two addresses is the address of the destination register file in the case of the execution of the Fload instruction, so the address is transferred to the external clock which treats the Fload instruction. The previous instruction is executed using the address of the u-pipe, and the Fload instruction can send the destination address to the execution logic which executes the Fload instruction. Accordingly, two operations can be simultaneously performed.

Consequently, the present invention can be executed in parallel executed with the existing execution way of the Fxch instruction, using the destination address which has no connection with u-pipe in case the Fload instruction is executed along with other instructions in v-pipe.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for processing an exchange instruction and a load instruction from a memory in parallel in a pipe-lined processor having a first pipe-line, a second pipe-line and a register file of a stack structure, the apparatus comprising:

a stack-top updating means for generating a new stack-top signal and a current stack-top signal by updating the stack-top after receiving an information signal about a modification of the stack-top following execution of an instruction by the first pipe-line, the stack-top updating means also receiving a control signal which represents a load instruction executed by one of the second pipe-line and the first pipe-line, and a second pipe-line enable signal;

an AND gate for ANDing the second pipe-line enable signal and the control signal to detect execution of the load instruction in the second pipe-line;

a decoder for decoding the information signal;

a first adder for adding the decoded signal and the current stack-top signal;

a subtracter for subtracting 1 from an output signal of the first adder corresponding to an output of the AND gate;

a first multiplexer for outputting the new stack-top signal which is that one of the output signal of the first adder and the output signal of the subtracter that corresponds to the output signal of the AND gate; and a register for storing an output signal of the first multiplexer and for outputting the current stack-top signal;

a first pipe-line address generating means for generating a first source operand pointer address, a second source operand pointer address and a first destination operand pointer address of instruction which is to be executed in the first pipe-line by receiving the current stack-top signal, a first source operand, a second source operand and a first destination information instruction inputted to the first pipe-line;

a second pipe-line address generating means for generating a third source operand pointer address and a fourth operand pointer address of one of the load instruction and the exchange instruction which is to be executed in the second pipe-line, by receiving the source operand of an instruction which comes to the second pipe-line, the new stack-top signal from the stack-top updating means, the first source operand pointer address and the second source operand pointer address from the first pipeline address generating means, and the second pipe-line enable signal and the control signal representing that the load instruction is executed at one of the first pipe-line and the second pipe-line, the second pipe-line address generating means including, an OR gate for ORing the second pipe-line enable signal and the control signal;

a second multiplexer for outputting, as the third source operand pointer address of an instruction executed in the second pipe-line, that one of the stack-top signal and the first source operand pointer address that corresponds to an output signal of the OR gate;

a second adder for adding the new stack-top signal and the source operand of the instruction which comes to the second pipe-line; and a third multiplexer for outputting, as the fifth source operand pointer address of the instruction executed in the second pipe-line, that one of an output signal of the second adder and the second source operand pointer address that corresponds to the output signal of the OR gate;

a pointer register file that has an address of an actual data register file by receiving the address output from both the second pipe-line address generating means and the first pipe-line address generating means; and a physical data register file for outputting a stored operand to an execution unit corresponding to the actual data register file address output from the pointer register file.

2. The apparatus in accordance with claim 1, wherein the first multiplexer selects and outputs the output signal of the subtracter as the new stack-top signal responsive to execution of the load instruction in the second pipeline.

3. The apparatus in accordance with claim 1, wherein the second multiplexer selects and outputs the new stack-top signal as the third source operand pointer address of the instruction executed in the second pipe-line responsive to one of the second pipe-line enable signal and the control signal being "high", the second multiplexer selecting and outputting the first source operand pointer address as the third source operand pointer address of the instruction executed in the second pipe-line in other cases.

4. The apparatus in accordance with claim 1, wherein the third multiplexer selects and outputs the output signal of the second adder as the fourth source operand pointer address of the instruction executed in the second pipe-line responsive to one of the second pipe-line enable signal and the control signal being "high", the third multiplexer selecting and outputting the second source operand pointer address as the fourth source operand pointer address of the instruction executed in the second pipe-line in other cases.

5. The apparatus in accordance with claim 1, wherein the pointer register file transfers an address of a load destination register file to an external block responsive to execution of the load instruction.

6. An apparatus for processing a load instruction from a memory in parallel in a pipe-lined processor having a first pipe-line, a second pipe-line and a register file of a stack structure, the apparatus comprising:

a stack-top updating unit for generating a new stack-top signal and a current stack-top signal by updating the stack-top after receiving an information signal, a second pipe-line enable signal and a control signal, the control signal representing execution of a load instruction by one of the second pipe-line and the first pipe-line, said stack-top updating unit including, an AND gate for ANDing the second pipe-line enable signal and the control signal to detect execution of the load instruction in the second pipe-line;

a decoder for decoding the information signal;

a first adder, coupled to the decoder, for adding the decoded signal and the current stack-top signal;

a subtracter, coupled to an output of the first adder and to an output of the AND gate, for subtracting 1 from the output of the first adder corresponding to the output of the AND gate;

a first multiplexer, coupled to an output of the subtractor, the output of the AND gate, and the output of the first adder, for outputting the new stack-top signal which is that one of the output of the first adder and the output of the subtracter that corresponds to the output of the AND gate; and a register, coupled to an output of the first multiplexer, for storing an output signal of the first multiplexer and for outputting the current stack-top signal;

a first pipe-line address generating unit for generating a first source operand pointer address, a second source operand pointer address and a first destination operand pointer address of an instruction which is to be executed in the first pipe-line by receiving the current stack-top signal, a first source operand, a second source operand and a first destination information instruction inputted to the first pipe-line;

a second pipe-line address generating unit for generating a third source operand pointer address and a fourth operand pointer address of one of the load instruction and the exchange instruction which is to be executed in the second pipe-line, by receiving the source operand of an instruction which comes to the second pipe-line, the new stack-top signal, the first source operand pointer address and the second source operand pointer address, the second pipe-line enable signal and the control signal, the second pipe-line address generating unit including, an OR gate for ORing the second pipe-line enable signal and the control signal;

a second multiplexer, coupled to an output of the OR gate, for outputting as the third source operand pointer address of an instruction executed in the second pipe-line, that one of the stack-top signal and the first source operand pointer address that corresponds to an output signal of the OR gate;

a second adder for adding the new stack-top signal and the source operand of an instruction which comes to the second pipe-line; and a third multiplexer, coupled to an output of the second adder and to the output of the OR gate, for outputting as the fifth source operand pointer address of the instruction executed in the second pipe-line, that one of an output signal of the second adder and the second source operand pointer address that corresponds to the output signal of the OR gate;

a pointer register file, coupled to the first and second pipe-line address generating units, for outputting an address of an actual data register file responsive to receiving address output from the second pipe-line address generating unit and the first pipe-line address generating unit; and a physical data register file for outputting a stored operand to an execution unit corresponding to the actual data register file address output from the pointer register file.

7. The apparatus in accordance with claim 6, wherein the pointer register file transfers an address of a load destination register file to an external unit responsive to execution of the load instruction.

* * * * *